(12) United States Patent
Kato (10) Patent No.: US 8,826,291 B2
(45) Date of Patent: Sep. 2, 2014

(54) PROCESSING SYSTEM

(75) Inventor: Junya Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 231 days.

(21) Appl. No.: 13/554,691

(22) Filed: Jul. 20, 2012

(65) Prior Publication Data

US 2013/0239115 A1    Sep. 12, 2013

(30) Foreign Application Priority Data

Mar. 8, 2012 (JP) ................. 2012-052061

(51) Int. Cl.
*G06F 9/46* (2006.01)

(52) U.S. Cl.
USPC ........................................................ 718/104

(58) Field of Classification Search
USPC ........................................................ 718/104
See application file for complete search history.

(56) References Cited

U.S. PATENT DOCUMENTS

| 8,514,868 B2 * | 8/2013 | Hill ................................ 370/401 |
| 8,661,120 B2 * | 2/2014 | Atchison et al. ............... 709/224 |
| 8,667,495 B1 * | 3/2014 | Brandwine et al. ........... 718/104 |
| 2008/0077657 A1 | 3/2008 | Tagami et al. |
| 2010/0042720 A1 * | 2/2010 | Stienhans et al. ............. 709/226 |
| 2011/0167421 A1 * | 7/2011 | Soundararajan et al. ......... 718/1 |
| 2013/0042003 A1 * | 2/2013 | Franco et al. .................. 709/226 |
| 2013/0061220 A1 * | 3/2013 | Gnanasambandam et al. ... 718/1 |
| 2013/0179895 A1 * | 7/2013 | Calder et al. .................. 718/104 |

FOREIGN PATENT DOCUMENTS

| JP | 10-326201 A | 12/1998 |
| JP | 2002-342298 A | 11/2002 |
| JP | 2004-192449 A | 7/2004 |
| JP | 2008-027189 A | 2/2008 |
| JP | 2009-265778 A | 11/2009 |

OTHER PUBLICATIONS

Apache Camel, Graceful Shgutdown, Dec. 1, 2010, http://camel.apache.org/graceful-shutdown.html.*
Amazon, Auto Scaling Developer Guide API Version Aug. 1, 2010, Amazon Web Services General Reference.*
"Auto Scaling," http://aws.amazon.com/en/autoscaling/, Amazon Web Services, LLC, copyright 2012, pp. 1-3.

* cited by examiner

*Primary Examiner* — Emerson Puente
*Assistant Examiner* — Steven Do
(74) *Attorney, Agent, or Firm* — Sughrue Mion, PLLC (57) ABSTRACT

A processing system includes a process request queue that corresponds to a process group and additionally stores an arriving process request addressed to the process group, at least one processor that belongs to the process group, and that, upon being enabled to receive a new process request, retrieves a process request from the process request queue, and processes the retrieved process request, and a monitoring unit that monitors a process load of the process group, and that, upon determining through monitoring that the process load of the process group becomes lower than a predetermined contraction threshold value, issues a group contraction instruction to the process group.

6 Claims, 10 Drawing Sheets

PROCESSING SYSTEM

CROSS-REFERENCE TO RELATED APPLICATIONS

This application is based on and claims priority under 35 USC 119 from Japanese Patent Application No. 2012-052061 filed Mar. 8, 2012.

BACKGROUND (i) Technical Field

The present invention relates to a processing system.

(ii) Related Art

A system providing cloud computing service is increasingly in widespread use today. In such a system, a user is allowed to use computation resources owned by a service provider in the form of a billing system. Such a service typically includes a so-called autoscaling function that increases or decreases computation resources to be used for the user as necessary.

SUMMARY

According to an aspect of the invention, a processing system is provided. The processing system includes a process request queue that corresponds to a process group and additionally stores an arriving process request addressed to the process group, at least one processor that belongs to the process group, and that, upon being enabled to receive a new process request, retrieves a process request from the process request queue, and processes the retrieved process request, and a monitoring unit that monitors a process load of the process group, and that, upon determining through monitoring that the process load of the process group becomes lower than a predetermined contraction threshold value, issues a group contraction instruction to the process group. If the group contraction instruction has been issued, processors of a predetermined number within the process group become suspension targets, and the processor as the suspension target stops retrieving a new process request from the process request queue of the process group, stops operating upon completing the processing of all the retrieved process requests, and is then excluded from the process group.

BRIEF DESCRIPTION OF THE DRAWINGS

Exemplary embodiments of the present invention will be described in detail based on the following figures, wherein:

FIG. 8 illustrates an example of a process flow of the job processor that has no job waiting for resumption and suspends an operation thereof for scale-in;

FIG. 9 illustrates an example of a process flow of the job processor that has a job waiting for resumption and suspends an operation thereof for scale-in.

DETAILED DESCRIPTION

Figure 1:
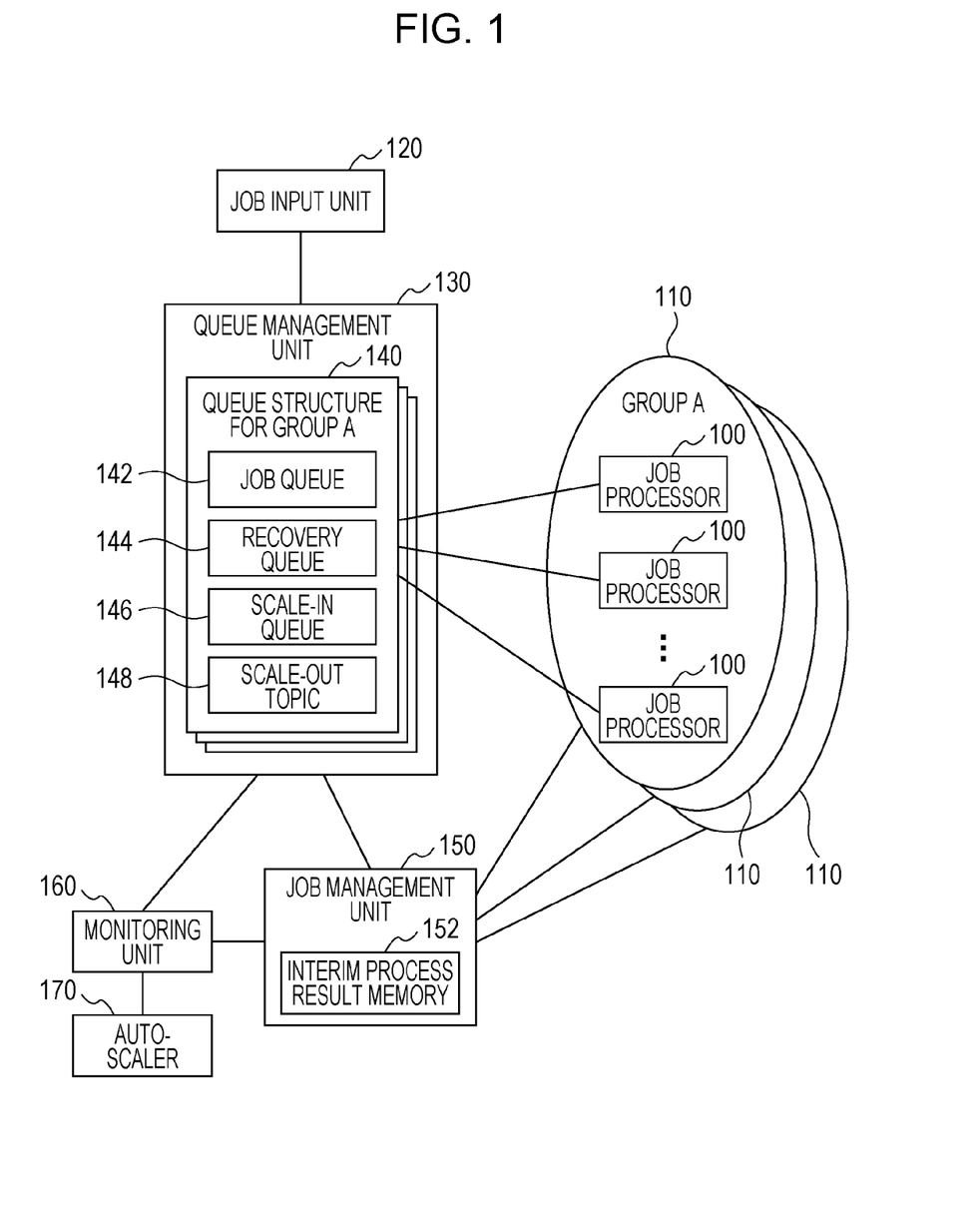
FIG. 1 illustrates a configuration of a processing system of an exemplary embodiment.

FIG. 1 illustrates a processing system of one exemplary embodiment of the present invention. The word "scale-in" in the following discussion refers to a scale contraction of a process group 110, i.e., a process of decreasing the number of job processors 100 belonging to the process group 110. The word "scale-out" refers to a scale expansion of the process group 110, i.e., a process of increasing the number of job processors 100 belonging to the process group 110.

The processing system of FIG. 1 receives a process request via a network such as the Internet from a client apparatus (not illustrated), and performs distributed processing responsive to the process request among multiple job processors 100. Each job processor 100 may be a single computer as a hardware structure or a virtual machine (i.e., instance of a class of the job processor 100). Each job processor 100 may also be a processor for each client in a system that executes a process to provide service for multiple clients on a single virtual machine. Multiple job processors 100 are typically distributed over a network as in a cloud computing system. Alternatively, multiple job processors 100 may be implemented on a single computer. A process responsive to a process request, i.e., a process executed by the job processor 100 in the system (or processes executed in parallel by multiple job processors 100) is not limited to any particular process. For example, the processes performed in response to a process request include performing an optical character reading operation on an image of a document scanned by a digital multi-function apparatus as a client apparatus (a multi-function apparatus functioning as part photocopier, part scanner, and part printer), extracting data of each element in the document, and then storing the data on a database. The process request includes process procedure information that describes a content of the process request in accordance with a predetermined format. The process described by the process procedure information is a process flow that includes a sequence of at least one process unit respectively represented by an individual command (the process unit is referred to as a "task"). The process request may also include target data that become a target of the process defined by the process procedure information. The target data may include any data, such as image data, and document data created by a word processor, or through an application such as spreadsheet. The process request may also include, instead of substance of data, reference information that refers to a storage location of the substance of the data over a network. The client apparatus that issues the process request is not limited to the multi-function apparatus. The client apparatuses may include other types of apparatuses having an information processing function, such as a personal computer and a facsimile machine.

The processing system includes multiple job processors 100 and provides a user with some of the job processors 100. The word "user" herein refers to not only an individual but also a group of individuals, such as, a company. The processing system assigns a process group 110 including at least one job processor 100 to each individual user. The multiple job processors 100 in the process group 110 process the process request in a distributed fashion. Each job processor 100 recognizes which process group 110 own job processor 100 belongs to (for example, on startup, the job processor 100 is notified of an identification (ID) of the process group which the job processor 100 belongs to). The job processor 100 retrieves a job of the process group 110 thereof, and executes the job. The number of process groups 110 assigned to the user is not limited to one. One process group 110 is shared by multiple subscribers. A multi-tenant process may be performed. In the multi-tenant process, processes of the multiple subscribers may be exclusively performed.

The process request transmitted to the processing system from the client apparatus is received by a job input unit 120. In accordance with the process procedure information contained in the received process request, the job input unit 120 generates a job that manages the process of the process request in the system (the job represents the process responsive to the process request). The job input unit 120 registers the generated job on a job management unit 150 and a queue management unit 130. A job ID (identifier) uniquely identifying the job within the system is appended to the generated job. The job management unit 150 stores the process procedure information contained in the process request and target data, associated with the job ID. These pieces of information are used when each job processor 100 processes the job. The job management unit 150 then retrieves, from the job processor 100 and the like, information of an execution status of each job (for example, job unexecuted, job execution in progress, job completed, and error), and manages the information in association with the job ID. In such a case, the information of the job execution status is supplied to the client apparatus upon being requested. The job management unit 150 may include an interim process result memory 152 to be described in detail below. The job processor 100 having becoming a suspension target because of scale-in may return to the job management unit 150 process result data at an interim stage of a job (hereinafter referred to as interim process result data). The interim process result memory 152 then stores the interim process result data in association with the job ID.

The queue management unit 130 has a queue structure. The queue structure is used to manage in a first-in first-out method the execution order of a job group in response to the process request received by the processing system. The processing system includes three queues in the queue structure, namely, job queue 142, recovery queue 144, and scale-in queue 146.

The job queue 142 retains a job input via the job input unit 120. The input job is added to the tail of the job queue 142, and a job is retrieved from the head of the job queue 142 in a first-in first-out method, and the retrieved job is supplied to the job processor 100.

The recovery queue 144 retains an unfinished job returned from the job processor 100 that has become a suspension target to perform a scale-in process as described in detail below. The input job is added to the tail of the recovery queue 144, a job is retrieved from the recovery queue 144 in a first-in first-out method, and the retrieved job is then supplied to the job processor 100.

A priority relationship is established between the job queue 142 and the recovery queue 144. In the processing system, a job in the recovery queue 144 is processed with a higher priority than a job in the job queue 142. More specifically, the job processor 100 retrieves a job from the recovery queue 144 while any job is available from the recovery queue 144. The job processor 100 then starts to retrieve a job from the job queue 142 only when the recovery queue 144 becomes empty.

In an example here, only the job IDs are stored in the job queue 142 and the recovery queue 144, and the job management unit 150 stores data substance of each job and management information. Such an arrangement is described for exemplary purposes only.

While the job queue 142 and the recovery queue 144 are queues retaining the jobs, the scale-in queue 146 is a queue retaining a scale-in instruction (more strictly, predetermined instruction information instructing a scale-in operation to be performed). In the processing system, if a necessity for the scale-in operation arises, scale-in instructions of a predetermined number (the number may be equal to the number of job processors to be suspended in a single scale-in operation, "1", for example), and the scale-in instructions are added to the scale-in queue 146. The job processor 100 autonomously retrieves the scale-in instruction from the scale-in queue 146. Only the job processor 100 having received the scale-in instruction becomes a suspension target for scale-in.

The processing system includes a scale-out topic 148 in addition to the three queues 142, 144, and 146. The scale-out topic 148 is a message transfer mechanism in a topic form. For example, as in Java® message service (JMS), "topic" is a mechanism to transfer (multicast) a message to multiple receivers while "queue" is a mechanism to transfer a message to a single receiver. If a necessity for the scale-out arises, the scale-out topic 148 receives a scale-out instruction. The scale-out instruction input to the scale-out topic 148 is retrieved by all the job processors 100 in the process group 110 corresponding to the scale-out topic 148. As will be described in detail below, the processing system includes not only an active job processor 100 (hereinafter referred to as a job processor 100 in a normal operating state) that retrieves a job from the queue and executes the job, but also a ready-to-retire job processor 100 (hereinafter referred to as a job processor 100 in a "prepared-for-suspension" state) that is a suspension target for the scale-in, stops job retrieval, but still continues to be present and to execute an already retrieved job. The scale-out topic 148 is used to restore the job processor 100 in the prepared-for-suspension state back to the normal operating state.

The processing system executes a first stage scale-out to restore the job processor 100 in the prepared-for-suspension state to the normal operating state, and a second stage scale-out to generate a job processor 100 that is to belong to the process group 110. The second stage scale-out is the scale-out in a standard sense. Those two stage scale-outs are described in detail below.

The queue management unit 130 in the processing system includes, on each process group 110 basis, a queue structure 140 including the job queue 142, the recovery queue 144, the scale-in queue 146, and the scale-out topic 148. Each job processor 100 receives from the queue structure 140 corresponding to the process group 110 thereof a job, a scale-in instruction, and a scale-out instruction.

In the processing system, the number of jobs retained in the job queue 142 of each process group 110 is managed by the job management unit 150 and is updated as appropriate in response to the addition of a job to the queue or the retrieval of a job from the queue. The number of jobs may be managed by the queue management unit 130 in place of the job management unit 150.

The processing system has an autoscaling function that automatically adjusts the number of job processors 100 belonging to the process group 110 in accordance with a process load of the process group 110. If the process load of the process group 110 increases in the processing system, a new job processor 100 is added to the process group 110 in response to an increase. If the process load of the process group 110 decreases, the job processors 100 are reduced in response to a decrease. This arrangement causes job processors 100 of a minimum number to be active so that a response time of the process group 110 (a period of time from when the process request is transmitted to when a result responsive to the process request is obtained) is maintained to be generally constant. If the number of active job processors 100 is to be reflected in billing for service, it is desirable to keep active the job processors 100 of a minimum number that maintains service quality.

The autoscaling function of the processing system is implemented through central control of a monitoring unit 160 and an autoscaler 170 in concert with an autonomous operation of each the job processor 100 in response to the scale-in instruction and the scale-out instruction.

Figure 2:
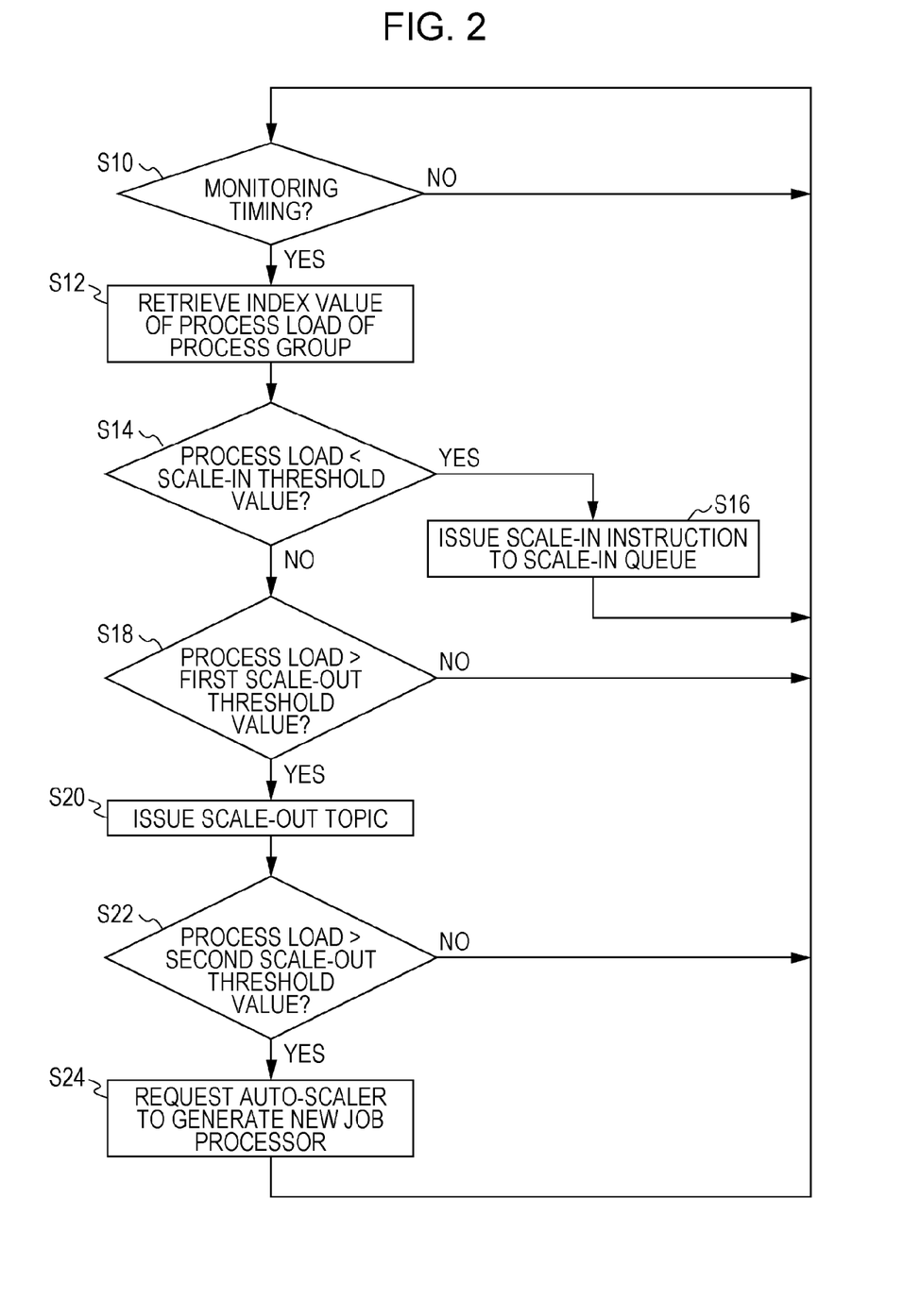
FIG. 2 is a flowchart illustrating an example of a process of a monitoring unit.

The monitoring unit 160 monitors, on each process group 110, information that serves as determination criterion according to which the process group 110 is scaled out (to increase the job processors 100 in number) or scaled in (to reduce the job processors 100 in number). In response to the monitoring results, the monitoring unit 160 determines whether to scale out or scale in the process group 110. The information of the determination criterion is a quantity of the process load of the process group 110. The monitoring unit 160 sends the scale-in instruction or the scale-out instruction to the queue management unit 130 in response to the determination results. FIG. 2 illustrates a detailed process of the monitoring unit 160. The monitoring unit 160 executes the procedure of FIG. 2 for each process group 110 present in the processing system (in other words, the monitoring unit 160 operates exclusively for a respective process group 110).

In the process of FIG. 2, the monitoring unit 160 waits on standby for a monitoring timing determined by a predetermined rule, such as a timing of each of predetermined time intervals (S10). When it is the monitoring timing, the monitoring unit 160 retrieves from the job management unit 150 an index value of the process load of the process group 110 as a monitoring target (S12). For example, the index value is the number of jobs present within the job queue 142 of the process group 110. The larger the number of jobs is, the larger the number of unfinished jobs is. The number of jobs to be executed is large with respect to the current throughput of the process group 110. It takes time for a new job to be executed by the process group 110, and the process load is high. (In principle, the larger the number of job processors 100 is, the higher the throughput of the process group 110 is.) In this example, the monitoring unit 160 retrieves from the job management unit 150 a job count in the job queue 142 corresponding to the process group 110 as a monitoring target.

The monitoring unit 160 compares the retrieved index value with a predetermined scale-in threshold value (determines whether the index value is lower than the scale-in threshold value in FIG. 2) (S14). If the index value of the process load is lower than the scale-in threshold value (yes from S14), the monitoring unit 160 determines that the process group 110 as the monitoring target is to be scaled in. The monitoring unit 160 adds the scale-in instructions of a predetermined number (for example, 1) to the scale-in queue 146 corresponding to the process group 110 (S16). The job processor 100 in an accessing process group 110 retrieves the scale-in instruction from the scale-in queue 146 in a first-in first-out method, starting with the leading scale-in instruction.

If the index value of the process load is equal to or higher than the scale-in threshold value (no from S14), the monitoring unit 160 compares the index value with a predetermined first scale-out threshold value (determines whether the index value is higher than the first scale-out threshold value in FIG. 2) (S18). The first scale-out threshold value is a value equal to or higher than the scale-in threshold value. If the index value of the process load is higher than the first scale-out threshold value (yes from S18), the monitoring unit 160 determines that the process group 110 as the monitoring target is to be scaled out. The monitoring unit 160 transmits the scale-out instruction to the scale-out topic 148 corresponding to the process group 110 (S20). The scale-out instruction received by the scale-out topic 148 is received by all the job processors 100 belonging to the process group 110. (A scale-out related process of the job processor 100 is described below with reference to FIG. 7).

The scale-out process performed using the scale-out topic 148 is the first stage scale-out previously described, i.e., a process to restore the job processor 100 into the normal operating state from the prepared-for-suspension state. The first stage scale-out may be insufficient (in other words, no reduction effect of the process load results) if there is no job processor 100 in the prepared-for-suspension state. In such a case, the second stage scale-out (in other words, the scale-out in a standard sense) is performed. More specifically, a new job processor 100 is generated, and assigned to the process group 110 as a scale-out target.

In the process of FIG. 2, the monitoring unit 160 compares the index value of the process load of the process group 110 as the monitoring target with a second scale-out threshold value higher than the first scale-out threshold value (S22). If the process load of the process group 110 becomes higher than the first scale-out threshold value, the first stage scale-out is performed (attempted). Even if all the job processors 100 in the prepared-for-suspension state are restored back to the normal operating state (job retrieval), the problem of a high process load may not be solved. In such a case, the process load may become higher than the second scale-out threshold value, and a determination result from S22 may be yes. If the determination result from S22 is yes, the monitoring unit 160 requests the autoscaler 170 to perform the standard scale-out on the process group 110 (i.e., to add new job processors 100 of a predetermined number to the process group 110) (S24). The autoscaler 170 issues a generation command to a system managing a group of the job processors 100 (such as a server managing a virtual machine group) to instruct the system to generate a job processor. A new job processor 100 is thus generated as a virtual machine. The generated job processor 100 is notified of an ID (as an argument of the generation command) of the process group 110 as the scale-out target. The generated job processor 100 belongs to that process group 110. When accessing the queue management unit 130, the job processor 100 receives a job addressed to the process group 110 thereof and a variety of instructions by presenting the notified ID of the process group 110 to the queue management unit 130. The second stage scale-out process executed by the autoscaler 170 is identical to a scale-out process executed by an autoscaler in the related art.

If the process load of the process group 110 is equal to or higher than the scale-in threshold value and equal to or lower than the first scale-out threshold value, neither a process for the scale-in nor a process for the scale-out is performed for the process group 110.

In the processing system, the scale-in process is performed in response to the scale-in instruction from the monitoring unit 160. The autoscaler 170 is free from the process for the scale-in. Optionally, an autoscaler 170 in the related art may have the function of the monitoring unit 160.

In the discussion heretofore, the number of jobs in the job queue 142 is the index value of the process load. Alternatively, the sum of the numbers of jobs in the job queue 142 and the recovery queue 144 may serve as the index value of the process load. Furthermore, the index value of the process load of the process group 110 may be determined by accounting for not only the numbers of jobs in the job queue 142 (and the recovery queue 144) but also other information related to the process group 110 managed by the job management unit 150.

Operations of the job processor 100 are described below. The operations of the job processor 100 include a basic operation of retrieving and executing a job, an operation of retrieving a scale-in instruction and operating in response to the scale-in instruction, and an operation of retrieving a scale-out instruction and operating in response to the scale-out instruction. The operations are described in order as below.

Figure 3:
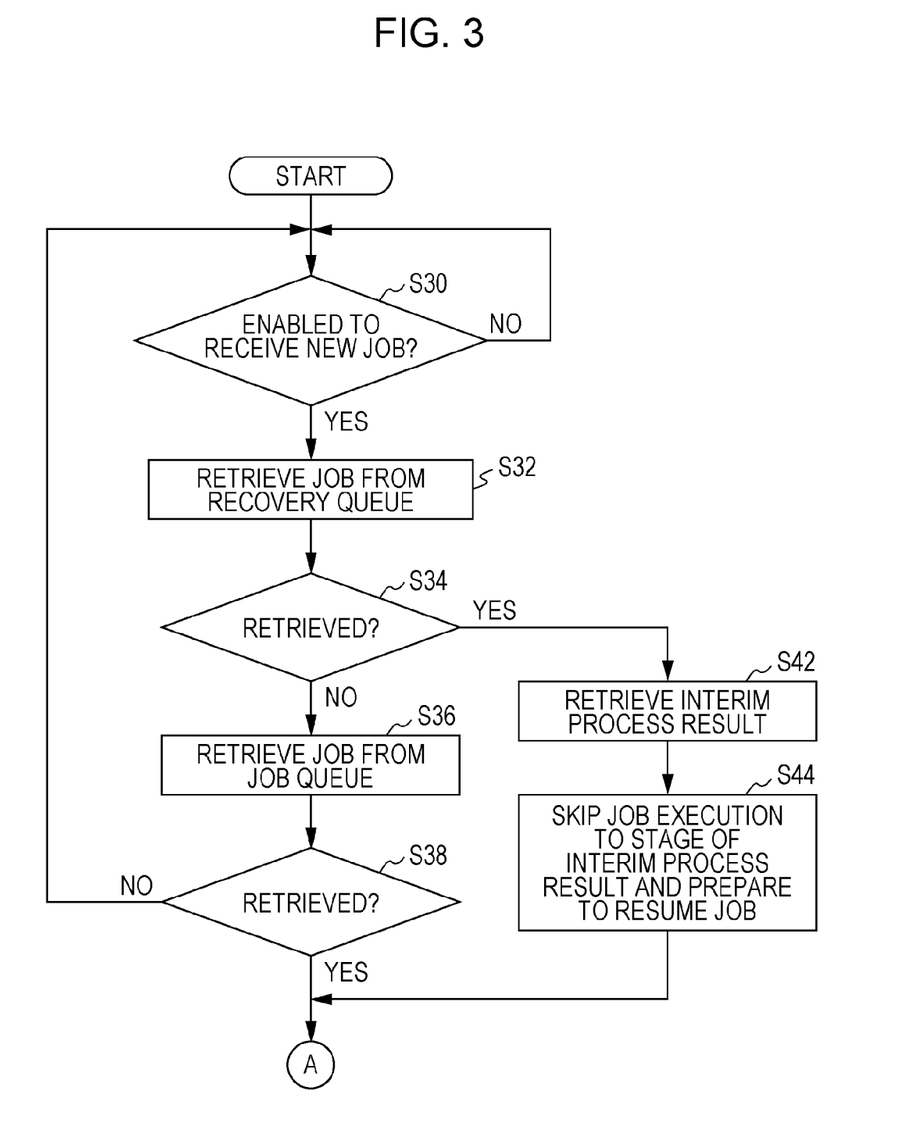
FIG. 3 is a flowchart illustrating an example of a job retrieval process of a job processor.
Figure 4:
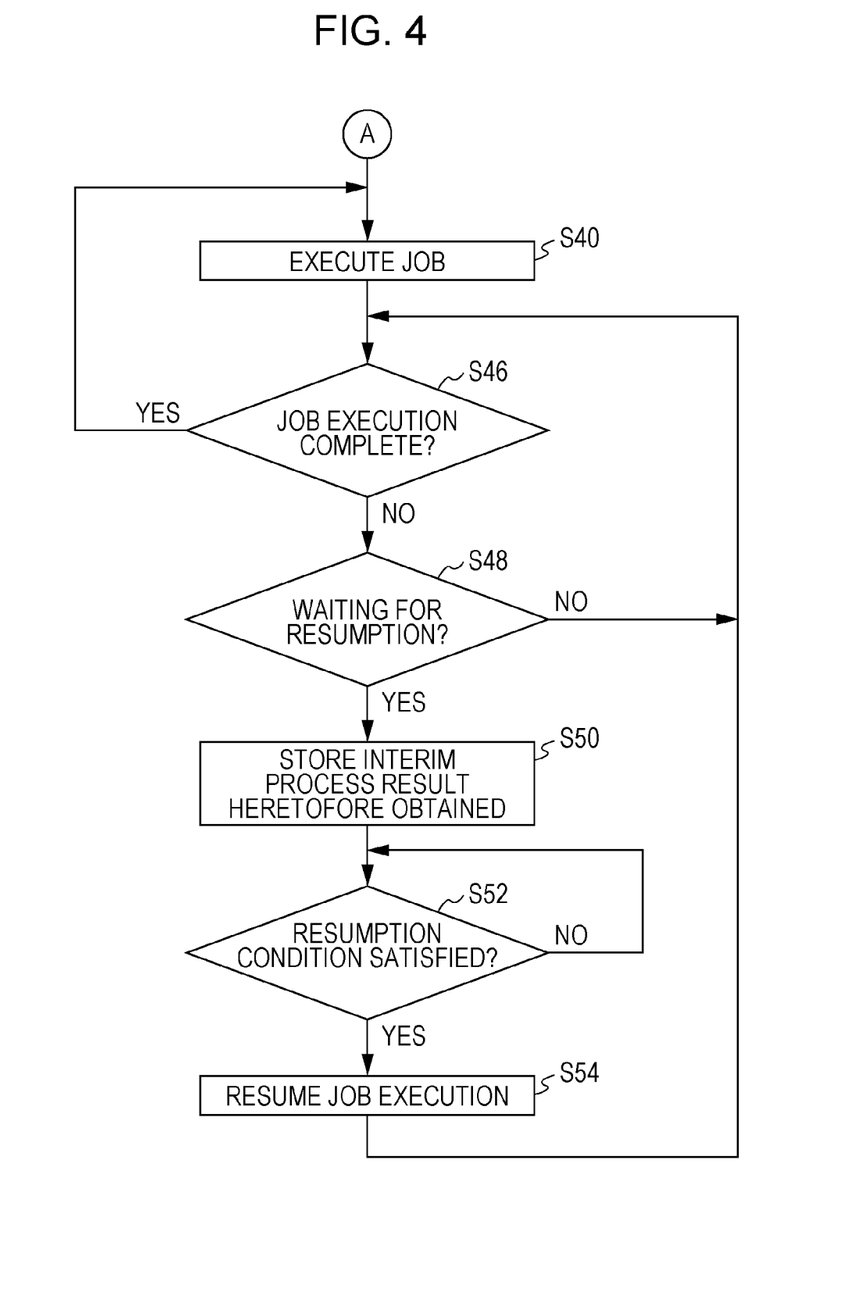
FIG. 4 is a continuation of the flowchart of FIG. 3.

The basic operation is described with reference to processes of FIGS. 3 and 4. In the process of FIG. 3, the job processor 100 receives a job. In the process of FIG. 4, the job processor 100 executes the received job. The job processor 100, typically but not necessarily, runs multiple threads or processes in order to perform multiple jobs in parallel. Each time the job processor 100 is enabled to receive a new job (S30), the job processor 100 retrieves a new job from the queue structure 140 corresponding to the process group 110 that the job processor 100 belongs to. For example, if the number of jobs concurrently being processed becomes smaller than an upper job count limit of jobs that the job processor 100 is able to perform concurrently, the job processor 100 determines in S30 that a new job may be received. In another example, the job processor 100 includes a queue thereof that receives a job retrieved from the queue structure 140, and successively retrieves jobs from the queue and performs the retrieved jobs in order. If the number of jobs in the queue is smaller than the upper limit of job count of jobs that the queue is able to retain, a new job may be received.

The job processor 100, if enabled to receive a new job, retrieves a job from the recovery queue 144 with a higher priority than from the job queue 142. More specifically, if a determination result in S30 is yes, the job processor 100 retrieves a leading job in the recovery queue 144 in the queue structure 140 of the process group 110 to which the job processor 100 belongs (the job processor 100 retains the ID of the process group 110 to which the job processor 100 belongs) (S32).

If a job (i.e., the ID of the job) is retrieved from the recovery queue 144 in S32 (a determination result in S34 is yes), the job processor 100 retrieves from the job management unit 150 detailed information of the job (such as the process procedure information), and the interim process result (and further information indicating tasks that have given rise to the interim process result) (S42). If the tasks from the start of the process flow to the stage where the interim process result is obtained are skipped (in other words, the tasks are regarded as being executed). In response to the interim process result, the job processor 100 sets an internal state of a thread or a process that executes the job, thereby setting the internal state of the thread or the process in a job resumption waiting state (S44). When processing proceeds to the process of FIG. 4, the job processor 100 executing the process of FIG. 3 resumes executing the job that another job processor 100 has returned to the recovery queue 144 for the purpose of scale-in.

If the recovery queue 144 is empty, the job processor 100 is unable to retrieve a job from the recovery queue 144 (the determination result in S34 is no). The job processor 100 then retrieves a leading job (i.e., the ID of the leading job) from the job queue 142 (S36). If no job is available from the job queue 142, the job processor 100 is unable to retrieve any job in S36 (a determination result in S38 is no), and repeats operations in S30 and subsequent steps. If a job is retrieved in S36 (the determination result in S38 is yes), the job processor 100 proceeds to perform the process of FIG. 4 on the job.

The job processor 100 performs the process of FIG. 4 each time a job is received in the process of FIG. 3. In the process of FIG. 4, the job processor 100 retrieves from the job management unit 150 the detailed information (such as the process procedure information and target data) of the job corresponding to the job ID retrieved from the job queue 142 in S36, and starts executing the job using the detailed information (S40). The leading job, after being retrieved, is deleted from the job queue 142. (The same is true of the recovery queue 144). The job processor 100 resumes executing the job having the job ID retrieved from the recovery queue 144 in S32 after the job execution proceeds to the resumption-waiting state in S42 and S44 (S40).

The job processor 100 successively executes the tasks of the job in accordance with the flow indicated by the process procedure information (S46). The job may be interrupted in the middle of the execution thereof, and may shift into the resumption-waiting state. For example, an interactive process may be performed in the job. The job processor 100 presents an input screen to a user, and waits on standby in the resumption-waiting state with the execution of the job interrupted. More specifically, the job processor 100 waits on standby until the user inputs data on the input screen and the input data is transmitted (i.e., the job processor 100 waits on standby until it is verified that the input data is correct). The job processor 100 also shifts into the resumption-waiting state if an instruction to interrupt job execution is received from the user or if a fault is detected in the middle of job execution. In accordance with the exemplary embodiment, the job in the resumption-waiting state is handled in a manner different from the normal job. The job processor 100 thus monitors whether the job being processed is shifted into the resumption-waiting state (S48). If the job is not in the resumption-waiting state, the job processor 100 returns to S46 to perform the process until the job is complete.

If the job shifts to the resumption-waiting state in S48, the job processor 100 stores the process result (hereinafter referred to as an "interim process result") of the job in the stage of the resumption-waiting state (S50). If a task of an interactive process is present in the flow of the job, the interim process result obtained throughout down to a task immediately preceding the task of the interactive process is stored. If the job execution is interrupted by an interruption instruction of the user or by a fault, the interim process result obtained throughout down to a task immediately preceding the interruption is stored. The interim process result to be stored includes a process result of the unfinished target data and an internal status of the job processor 100 at the stage of the resumption-waiting state (such as a value of a variable used in a process when the scale-in instruction is retrieved). The storage of the interim process result is performed as a preparation stage for a job in the resumption-waiting state to be returned together with the interim process result to the queue management unit 130 during the retrieval of the scale-in instruction. Subsequent to the storage, the job processor 100 waits until a resumption condition to shift from the resumption-waiting state is satisfied (S52). If the job processor 100 shifts into the resumption-waiting state in the interactive process, the resumption condition is that input data from the user serving as a target for the interactive process has been received. If the resumption condition is satisfied (a determination result in S52 is yes), the job processor 100 resumes executing the job (S54), and then returns to S46. Processing proceeds in accordance with the process flow until the execution of job is complete. If the execution of the job is complete, processing returns to S40. Since one job executed heretofore is complete, the job processor 100 is ready to execute a new job. If such a new job has been received, the job processor 100 executes that new job.

The process of the job processor 100 for the scale-in is described with reference to FIGS. 5 and 6.

Figure 5:
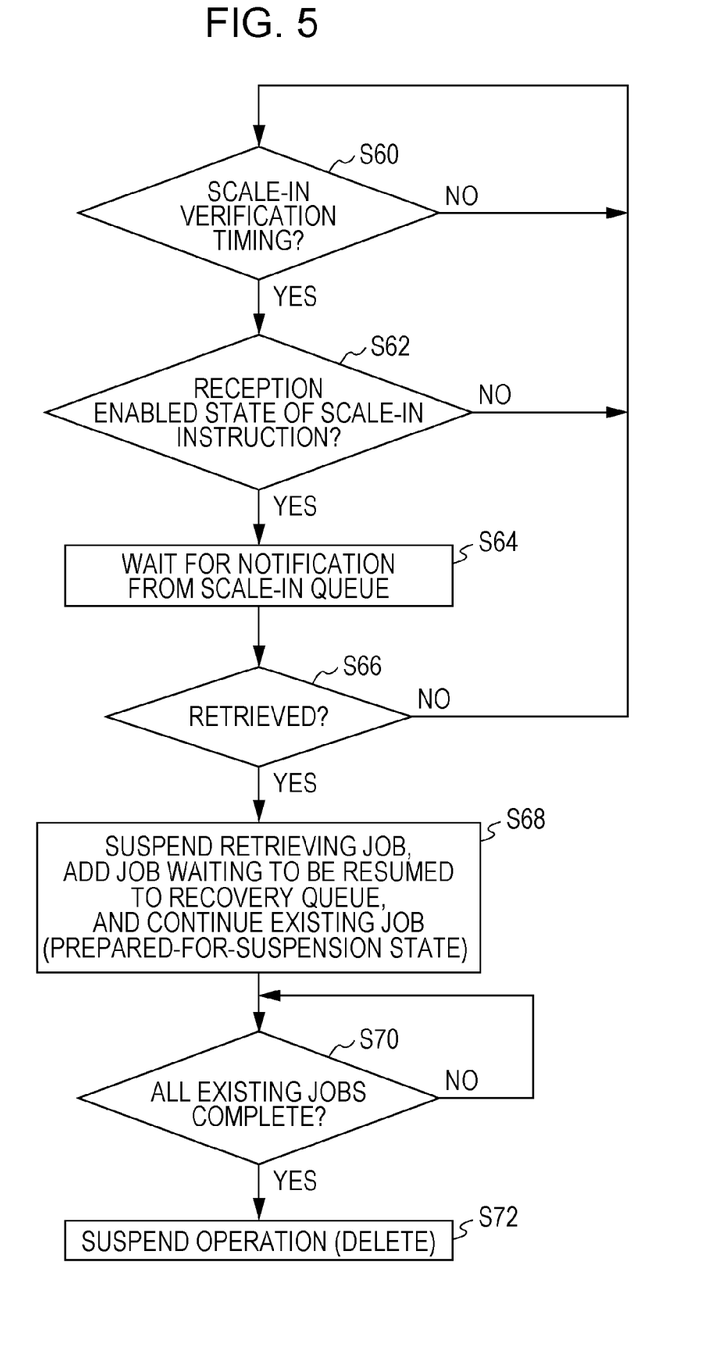
FIG. 5 is a flowchart illustrating an example of a scale-in process of the job processor.

As illustrated in FIG. 5, the job processor 100 checks whether it is a scale-in verification timing or not (S60). The scale-in verification timing may be a timing that comes at predetermined time intervals, or a timing when an amount of process of a job changes, such as when the job processor 100 starts or ends the job. When it is the scale-in verification timing, the job processor 100 determines whether the job processor 100 is in a reception enabled state of the scale-in instruction (S62).

If the scale-in is to be performed in the exemplary embodiment, a job processor 100 having a low process load is suspended with a higher priority. Whether to receive the scale-in instruction for each job processor 100 is switched depending on the process load of the job processor 100. The process for this operation is illustrated in FIG. 6.

Figure 6:
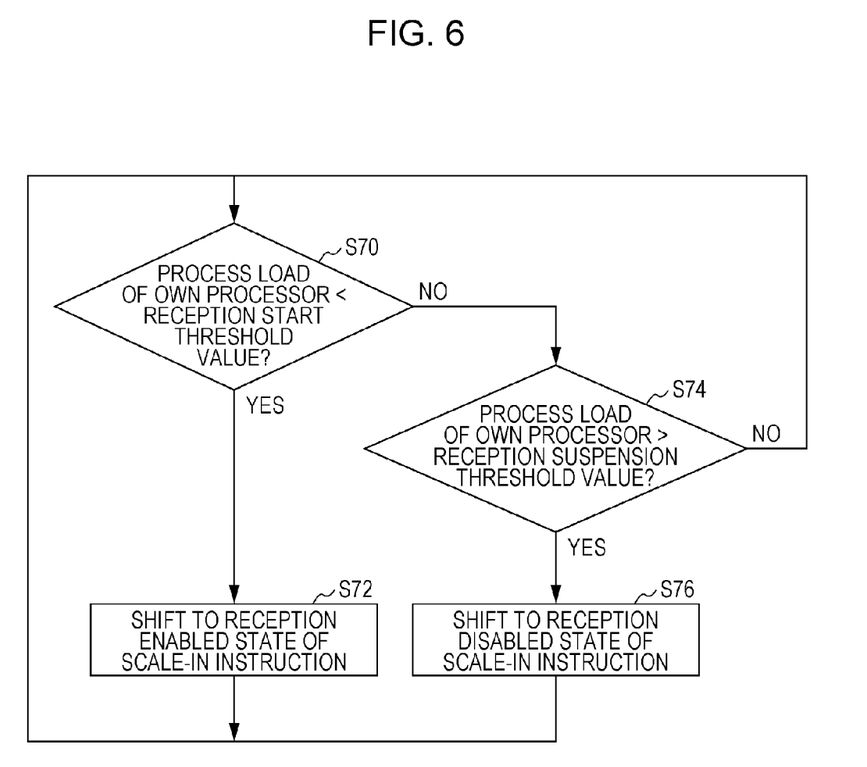
FIG. 6 is a flowchart illustrating a process of the job processor that switches between reception enabled state and reception disabled state of a scale-in instruction.

The process of FIG. 6 is executed by the job processor 100 periodically. The job processor 100 determines whether the process load thereof is lower than a predetermined reception start threshold value (S70). If the process load is lower than the reception start threshold value, the job processor 100 shifts into the reception enabled state of the scale-in instruction (S72). The process load of the job processor 100 is represented by the number of jobs concurrently being executed by the job processor 100, or a current usage rate of job execution resources (including the CPU and memory) assigned to the job processor 100, or an index value calculated from the number of jobs and the current usage rate.

If a determination result in S70 is no, the job processor 100 determines whether the process load thereof is higher than a predetermined reception suspension threshold value (S74). If the process load is higher than the reception suspension threshold value, the job processor 100 shifts into a reception disabled state of the scale-in instruction (S76). A value higher than the reception start threshold value (heaver load value) is set to the reception suspension threshold value. In this way, hysteresis is provided in the transition between the reception enabled state of the scale-in instruction and the reception disabled state of the scale-in instruction, and frequent shifting in the state caused by a slight variation in the process load is controlled. If a determination result in S74 is no, the reception enabled state or the reception disabled state of the scale-in instruction remains unchanged from the present state.

Returning back to the process of FIG. 5, the job processor 100 determines in S62 whether the current value of the state as to whether to receive the scale-in instruction indicates the reception enabled state.

If the determination result in S62 is yes, the job processor 100 shifts into a waiting state to wait for the scale-in instruction from the scale-in queue 146 corresponding to the process group 110 of the job processor 100 (S64). If the scale-in queue 146 is then empty, no scale-in instruction comes in and is retrieved (a determination result in S66 is no). The job processor 100 then returns to S60 to wait until the next verification timing.

If the determination result in S62 is no, i.e., the job processor 100 is in the reception disabled state of the scale-in instruction, and the job processor 100 may be currently in a high load state. The job processor 100 is not rated for a suspension target in the scale-in. The process subsequent to S64 is not performed. The job processor 100 stops receiving the scale-in instruction from the scale-in queue 146 and returns to S60 to wait until the next scale-in verification timing.

If the job processor 100 waiting for the scale-in instruction is notified of the scale-in instruction in S66, the job processor 100 retrieves the scale-in instruction and shifts to the prepared-for-suspension state. More specifically, the job processor 100 stops retrieving the jobs from the recovery queue 144 and the job queue 142, but continues executing a job if the job is currently being executed (S68). If a job in the resumption-waiting state is present among the jobs that are currently being process, the job processor 100 returns that job to the recovery queue 144 of the process group 110 of the job processor 100 (i.e., adds that job to the tail of the recovery queue 144), and stops executing that job in S68. In other words, the job processor 100 in the resumption-waiting state does not continue executing the job if the job is in the resumption-waiting state at the moment the scale-in instruction has been retrieved. The job processor 100 transfers the process of the job to another job processor 100 that is in the normal operating state. When the job in the resumption-waiting state is returned to the recovery queue 144, the job processor 100 stores on the job management unit 150, in association with the job ID of the job, the data of the interim process result stored at the transition into the resumption-waiting state and the information indicating the tasks that have given rise to the interim process result. Through this operation, the other job processor 100 receiving the job from the recovery queue 144 later skips the initial process on the job using the information related to the interim process result and resumes executing the job at the stage of the resumption-waiting state.

Upon shifting in the prepared-for-suspension state in S68, the job processor 100 waits until all the jobs currently being executed are complete (S70). When all the jobs are complete, the job processor 100 stops itself (i.e., a virtual machine or an instance as the job processor 100) (S72). Through this operation, the job processor 100 becomes non-existent. The number of job processors 100 as the scale-in targets within the process group 110 is reduced by one. In the processing system described above, the job processor 100 stops and deletes itself. In a different system, another apparatus (process) that controls the generation and deletion of the job processor 100 is used so that the job processor 100 may request the other apparatus to delete the job processor 100.

The job processor 100 in the prepared-for-suspension state does not perform the process of FIG. 5. In other words, the job processor 100 already going to suspend does not become a new target of the scale-in.

A process of the job processor 100 for the scale-out is described with reference to FIG. 7.

Figure 7:
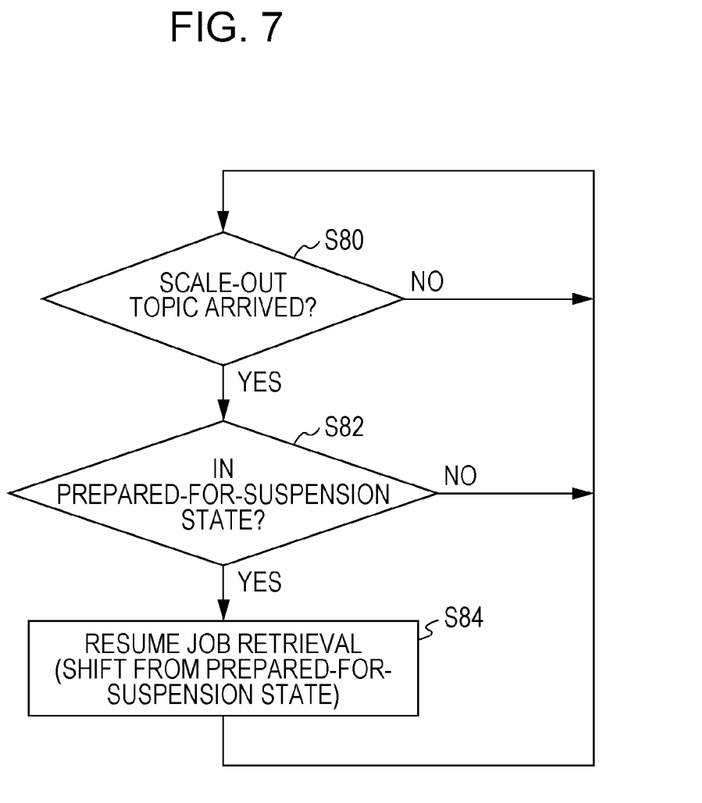
FIG. 7 is a flowchart illustrating an example of a scale-out process of the job processor.

In the process of FIG. 7, the job processor 100 waits for a scale-out topic (the scale-out instruction) to arrive (S80). The job processor 100 may wait for the scale-out topic continuously or checks the presence of a scale-out topic at a verification timing (at the same timing as the scale-in verification timing). When the scale-out topic arrives, the job processor 100 determines whether the job processor 100 itself is in the prepared-for-suspension state (S82). The job processor 100, if not in the prepared-for-suspension state, returns to S80 to wait for a scale-out topic.

Upon determining in S82 that the job processor 100 itself is in the prepared-for-suspension state, the job processor 100 resumes retrieving jobs from the recovery queue 144 and the job queue 142 (S84). The job processor 100 thus shifts from the prepared-for-suspension state into the normal operating state. Upon determining in S82 that the process group 110 itself is not in the prepared-for-suspension state (i.e., is in the normal operating state), the job processor 100 returns to S80 disregarding the scale-out topic received in S80.

If the job processor 100 in the prepared-for-suspension state having received the scale-out instruction shifts into the normal operating state, the number of job processors 100 in the normal operating state (i.e., retrieving the job) increases within the process group 110 as a scale-out target.

Processes of the processing system of the exemplary embodiment are described below with reference to FIGS. 8 through 10.

Figure 8:
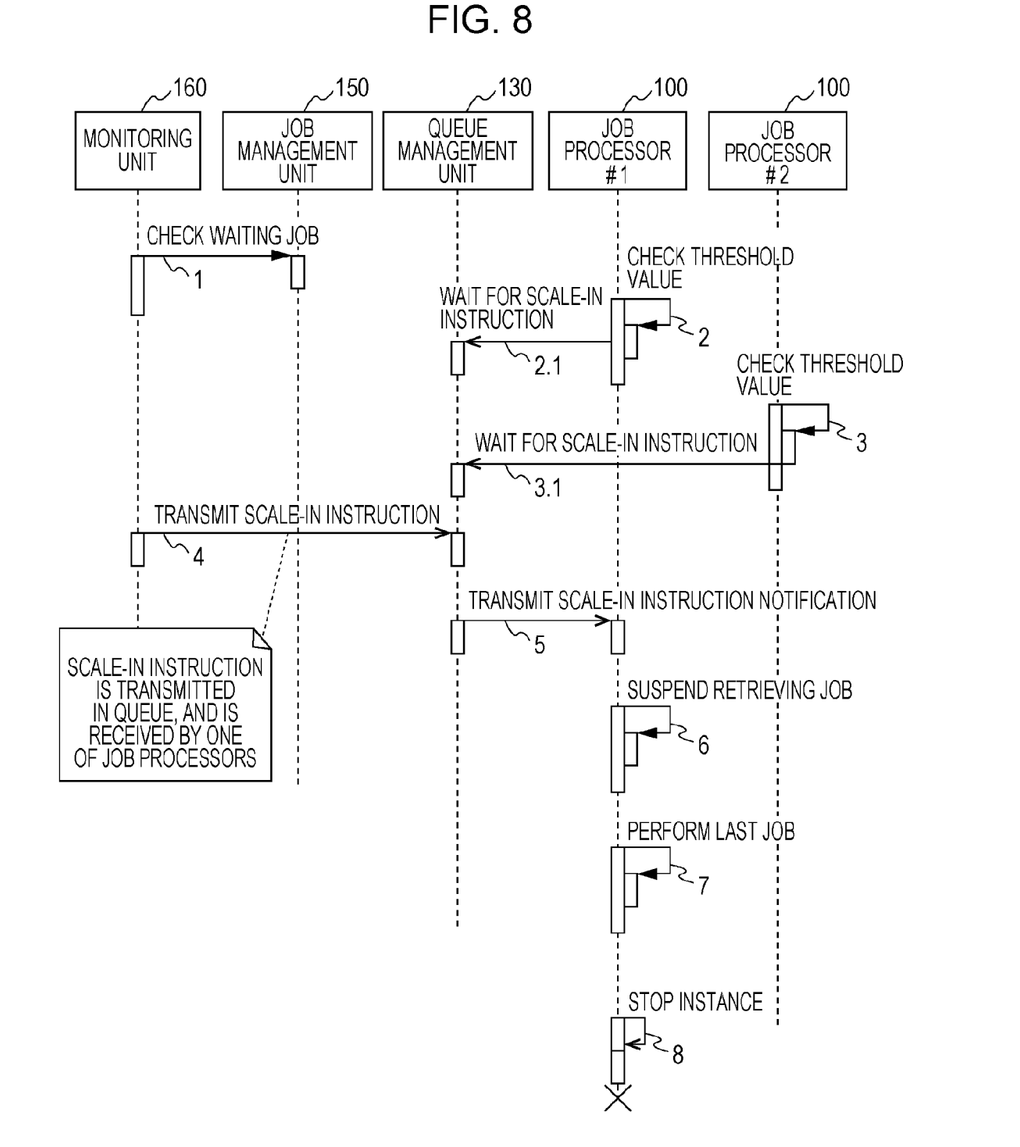

FIG. 8 illustrates an example of the scale-in process performed in the process group 110 including two job processors 100 (#1 and #2), each having no jobs in the resumption-waiting state.

In event (1), when it is the monitoring timing, the monitoring unit 160 retrieves information of the process load of the process group 110 (such as the number of waiting jobs within the queue structure 140) from the job management unit 150. Each of the job processors #1 and #2 compares the process load thereof with a threshold value (events (2.1) and (3.1)) In this example, the process load of each of the job processors #1 and #2 is lower than the threshold value, and the job processors #1 and #2 are in the scale-in instruction reception enabled state (waiting state). In the process of FIG. 5, the job processor 100 retrieves a job from the queue management unit 130 at each verification timing. In the process of FIG. 8, each of the job processors #1 and #2 stores on the queue management unit 130 a notification that each of the job processors #1 and #2 is in the waiting state. When the scale-in instruction is input to the scale-in queue 146, the queue management unit 130 notifies one of the job processors #1 and #2 of the scale-in instruction in the storage order of the waiting states. (A specific implementation method in the process of FIG. 8 is different from that in the process of FIG. 5, but the two processes are substantially identical in actual control). In the process of FIG. 8, the reception enabled state of the job processor #1 is stored on the queue management unit 130 earlier. In event (4), the monitoring unit 160 checks the process load of the process group 110 and determines that the scale-in is to be performed. The monitoring unit 160 then transmits one scale-in instruction in this example to the scale-in queue 146 of the process group 110 in the queue management unit 130. In event (5), when the scale-in instruction is input to the scale-in queue 146, the queue management unit 130 notifies the job processor in the storage order of the waiting state, thus, the job processor #1 first of the scale-in instruction. Since the number of scale-in instructions input to the scale-in queue 146 is one, the job processor #2 is not notified of the scale-in instruction. In event (6), the job processor #1 having received the scale-in instruction shifts into the prepared-for-suspension state. The job processor #1 stops retrieving a job from the queue management unit 130 while continuing executing the job already retrieved and being currently processed. When executing last one of the jobs being executed at the moment of the reception of the scale-in instruction is complete in event (7), the instance of the job processor 100 stops in event (8). In this way, the job processor #1 is deleted from the process group 110, and the number of job processors 100 forming the process group 110 is reduced by one.

Figure 9:
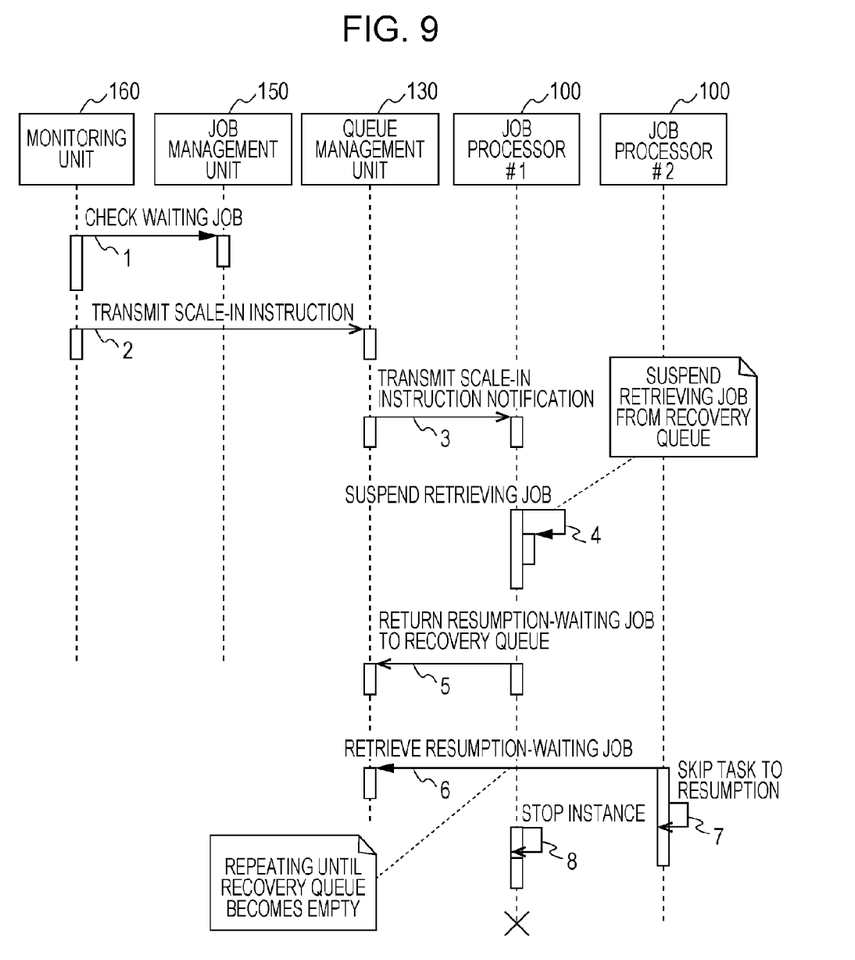

FIG. 9 illustrates an example of the scale-in process performed in the process group 110 including two job processors #1 and #2. The job processor #1 having received the scale-in instruction has a job in the resumption-waiting state.

In FIG. 9, the notification that at least the job processor #1 is in the waiting state for the scale-in instruction is already stored on the queue management unit 130. The monitoring unit 160 monitors the process load in event (1), and if the scale-in instruction is transmitted to the scale-in queue 146 in the queue management unit 130 in event (2), the queue management unit 130 notifies the job processor #1 of the scale-in instruction in event (3). The job processor #1 having received the scale-in instruction shifts into the prepared-for-suspension state, and stops retrieving a job from the queue management unit 130 in event (4). The job processor #1 has a job in the waiting state, and then returns all the jobs in the waiting state to the recovery queue 144 in the queue management unit 130 in event (5). The job processor #1 continues executing a job remaining and being currently processed (i.e., a job not in the waiting state). Upon completing the execution of the job, the job processor #1 stops and deletes itself in event (8).

The job processor #2 has not received the scale-in instruction, remains in the normal operating state and continues retrieving jobs. Upon being enabled to retrieve a new job, the job processor #2 attempts to retrieve a job from the recovery queue 144 first in event (6). The recovery queue 144 has a job in the resumption-waiting state returned by the job processor #1. The job processor #2 naturally retrieves that job. The job processor #2 retrieves the job in the resumption-waiting state, skips from the start of the flow of the job to the task at the stage prior to the resumption-waiting state, and then resumes executing the task at the stage of the resumption-waiting state in event (7). While a job is available from the recovery queue 144, the job processor #2 in the normal operating state retrieves the job from the recovery queue 144 with a higher priority.

Figure 10:
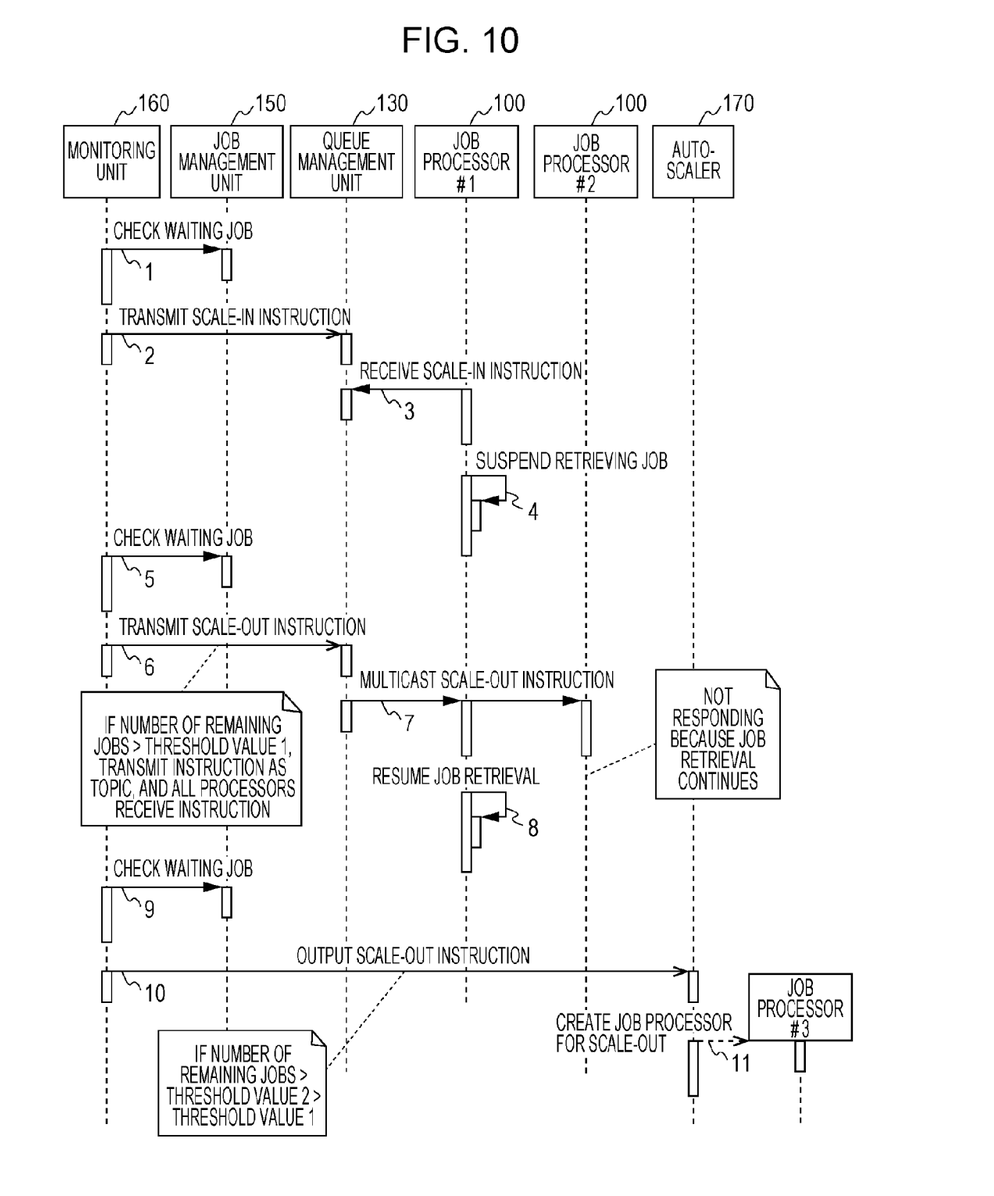
FIG. 10 illustrates an example of a process flow in which a first stage and a second stage of scale-out are performed.

FIG. 10 illustrates the first stage and second stage scale-outs. Events (1) through (4) in FIG. 10 are identical to events (1) through (4) in the process of FIG. 9. As illustrated in FIG. 10, the process load of the process group 110 increases and is to be scaled out before the job processor #1 in the prepared-for-suspension state deletes itself. If the monitoring result of the monitoring unit 160 indicates that the process load of the process group 110 is higher than the first scale-out threshold value in event (5) (see S18 of FIG. 2), the monitoring unit 160 transmits the scale-out instruction to the scale-out topic 148 in the queue management unit 130 in event (6). In event (7), the queue management unit 130 multicasts the received scale-out instruction to all the job processors, i.e., the job processors #1 and #2, within the process group 110. In the process of FIG. 7, the job processors 100 receive the scale-out instructions at timings unique thereto in an asynchronous fashion. In such a case, the job processors #1 and #2 receive the scale-out instructions not at the same timing as illustrated in FIG. 10 but at different timings with a slight time difference therebetween. The job processor #1 is in the prepared-for-suspension state (job retrieval suspended state). Upon receiving the scale-out instruction, the job processor #1 shifts from the prepared-for-suspension state, and resumes retrieving jobs in event (8). On the other hand, the job processor #2 remains in the normal operating state, and does nothing in response to the scale-out instruction (i.e., continues retrieving and performing jobs). Events (6) through (8) are the first stage scale-out. If an increase in the process load of the process group 110 is not sufficiently controlled, the process load of the process group 110 rises above the second scale-out threshold value in event (9). The monitoring unit 160 then detects the increased process load (see S22 of FIG. 2). The monitoring unit 160 outputs the scale-out instruction to the autoscaler 170 in event (10). Upon receiving the scale-out instruction in event (11), the autoscaler 170 generates a new job processor 100 within the process group. The process group 110 is scaled out.

In accordance with the exemplary embodiment, scale-in instructions of a predetermined number (for example, one scale-in instruction) are input to the scale-in queue 146 if the scale-in is to be performed (see FIG. 2). The job processor 100 in the reception enabled state of the scale-in instruction retrieves the scale-in instruction on a first-come first-serve basis, and shifts into the prepared-for-suspension state. Each time the scale-in is to be performed, the job processors 100 of a predetermined number in the normal operating state stop job retrieval and shifts into the prepared-for-suspension state. Upon completing the execution of the started job, the job processor 100 deletes itself.

In accordance with the exemplary embodiment, the monitoring unit 160 at the center is free from monitoring the job execution status of each job processor 100 to identify which monitoring unit the job processor 100 to stop. Upon receiving the scale-in instruction, the job processor 100 prepares autonomously itself for suspension. When all the jobs that have been started are complete, the job processor 100 suspends the operation thereof. In accordance with the exemplary embodiment, the monitoring unit 160 monitors the entire process load of the process group 110 instead of monitoring the operation status of each job processor 100 within the process group 110.

In contrast, in the first stage scale-out responsive to the scale-out instruction, the scale-out instruction is transmitted to all the job processors 100 within the target process group 110. The scale-out instruction is transmitted to all the job processors 100 in the prepared-for-suspension state, and all the job processors 100 in the prepared-for-suspension state shift back into the normal operating state. The prepared-for-suspension state is a transitional state, and the job processor 100 in the prepared-for-suspension state completes a started job within a relatively short period of time and then deletes itself. The number of job processors 100 in the prepared-for-suspension state present within the process group 110 at the issuance of the scale-out instruction is not so large (for example, as large as the number of scale-in instructions that are issued at one time). Even if all the job processors 100 in the prepared-for-suspension state shift into the normal operating state, a sudden large increase is unlikely in the number of job processors 100 within the process group 110. The first stage scale-out using the scale-out topic 148 simply causes the job processor 100 in the prepared-for-suspension state to resume job retrieval. The first stage scale-out is performed at a faster response speed than the standard (the second stage) scale-out. The first stage scale-out responds quickly to an increase in the process load. The number of job processors 100 in the normal operating state is increased, the retrieval speed of the jobs within the queue structure 140 is increased. The increase in the process load is eliminated or reduced.

If an excess in the process load is not solved through the first stage scale-out, the throughput of the process group 110 is increased by generating a new job processor 100 through the second stage scale-out (S24 of FIG. 2) in accordance with the exemplary embodiment.

In accordance with the exemplary embodiment, the job processor 100 having become a suspension target in response to the reception of the scale-in instruction (i.e., the job processor 100 in the prepared-for-suspension state) returns the job in the resumption-waiting state to the recovery queue 144. With this arrangement, the job processor 100 as the suspension target deletes itself, without waiting for the completion of the job in the resumption-waiting state, the job unknown as to when to be resumed and when to be completed.

The job processor 100 in the normal operating state executes the job in the resumption-waiting state returned to the recovery queue 144 with a higher priority than the job within the job queue 142. In the execution order of the jobs in the resumption-waiting state, the job is free from being overtaken by a later input job.

Among the job processors 100 within the process group 110, only a job processor 100 that is in the reception enabled state of the scale-in instruction with a process load thereof lower than the reception start threshold value retrieves the scale-in instruction from the scale-in queue 146 as described above. This is one operation example only. Alternatively, all the job processors 100 in the normal operating state within the job processor 100 may retrieve the scale-in instruction. Since the higher process load the job processor 100 has (the more jobs underway), the longer time the job processor 100 takes to shift from the prepared-for-suspension state to the deletion. However, the scale-in instruction is faster performed if a job processor 100 having a higher process load is excluded from participating in retrieving the scale-in instructions than if all the job processors 100 retrieve the scale-in instructions.

The processing system of the exemplary embodiment may include a billing unit that performs a billing operation depending on the number of job processors 100 within the process group 110.

A management function of the processing system is performed by the job input unit 120, the queue management unit 130, the job management unit 150, the monitoring unit 160, and the autoscaler 170. For example, the management function of the processing system may be performed by causing a general-purpose computer to execute a program describing the corresponding functional modules of those elements. The computer may include a hardware circuit structure including a microprocessor such as a central processing unit (CPU), memories including a random-access memory (RAM), and a read-only memory (ROM), a controller that controls a hard disk drive (HDD), a variety of input-output interfaces, and network interfaces that control connection with a network such as a local-area network, and a bus that interconnects those elements. A disk drive that reads data from and/or writes data to a removable disk recording medium such as a compact disk (CD) or a digital versatile disk (DVD) may be connected via the input-output interface to the bus. A memory reader and writer that reads data from and/or writes data to a removable non-volatile recording medium complying with a variety of standards, such as flash memory, may be connected via the input-output interface to the bus. The program describing the process content of functional modules may be stored onto a fixed storage device such as a hard disk drive via a recording medium such as CD or DVD, or via a communication line such as a network, and is installed on the computer. The program stored on the fixed storage device is read onto the RAM, and then executed by the microprocessor such as the CPU, and the above functional modules are implemented. Part or whole of the functional module group may be implemented using a hardware circuit such as dedicated large scale integration (LSI), application specific integrated circuit (ASIC), or field programmable gate array (FPGA).

The functional modules providing the management function may be distributed among multiple computers over the network in place of being implemented on a single computer. The functional modules are implemented through communications among the computers.

The job processor 100 is implemented by causing the computer having the management function thereon, or each of the multiple computers connected to the network to execute the program describing the function (process procedure) of the job processor 100.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing system comprising:
a process request queue that corresponds to a process group and additionally stores an arriving process request addressed to the process group;
at least one processor that belongs to the process group, and that, upon being enabled to receive a new process request, retrieves a process request from the process request queue, and processes the retrieved process request;
a monitoring unit that monitors a process load of the process group, and that, upon determining through monitoring that the process load of the process group becomes lower than a predetermined contraction threshold value, issues a group contraction instruction to the process group,
wherein if the group contraction instruction has been issued, processors of a predetermined number within the process group become suspension targets, and wherein the processor as the suspension target stops retrieving a new process request from the process request queue of the process group, stops operating upon completing the processing of all the retrieved process requests, and is then excluded from the process group; and
further comprising a contraction instruction queue associated with the process group,
wherein the monitoring unit adds the group contraction instruction to be issued to the process group to the contraction instruction queue associated with the process group, and
wherein only if the process load is lower than a suspension target threshold value predetermined for the process load, each processor performs a retrieval operation to retrieve the group contraction instruction from the contraction instruction queue, and then becomes the suspension target if the group contraction instruction has been retrieved through the retrieval operation.

2. The processing system according to claim 1, further comprising a recovery queue associated with the process group,
wherein if a process request that waits in a resumption-waiting state to be resumed from suspension is present among the retrieved process requests, the processor having become the suspension target adds the process request in the resumption-waiting state to the recovery queue to delist the process request in the resumption-waiting state from the retrieved process requests, and
wherein the processor retrieves a process request from the recovery queue with a priority if the processor becomes enabled to receive a new process request, and retrieves a process request from the process request queue if no process request is available from the recovery queue.

3. The processing system according to claim 2, further comprising an interim result memory that stores an interim process result of the process request at an interim stage of a process of the process request,
wherein the processor having become a suspension target causes the interim result memory to store the interim process result of the process request in the resumption-waiting state down to the stage of the resumption-waiting state in a manner such that the interim process result is associated with the process request added to the recovery queue, and
wherein upon retrieving the process request from the recovery queue, the processor resumes the process using the interim process result stored in association with the process request on the interim process memory on condition that the process of the process request has been completed to the stage of the resumption-waiting state.

4. The processing system according to claim 1, wherein upon determining through monitoring that the process load of the process group becomes higher than a predetermined expansion threshold value, the monitoring unit issues a group expansion instruction to each processor within the process group, and
wherein if the processor is the suspension target but is not yet suspended, the processor shifts from the suspension target in response to a reception of the group expansion instruction, and resumes retrieving a new process request from the process request queue.

5. The processing system according to claim 2, wherein upon determining through monitoring that the process load of the process group becomes higher than a predetermined expansion threshold value, the monitoring unit issues a group expansion instruction to each processor within the process group, and
wherein if the processor is the suspension target but is not yet suspended, the processor shifts from the suspension target in response to a reception of the group expansion instruction, and resumes retrieving a new process request from the process request queue.

6. The processing system according to claim 3, wherein upon determining through monitoring that the process load of the process group becomes higher than a predetermined expansion threshold value, the monitoring unit issues a group expansion instruction to each processor within the process group, and
wherein if the processor is the suspension target but is not yet suspended, the processor shifts from the suspension target in response to a reception of the group expansion instruction, and resumes retrieving a new process request from the process request queue.

* * * * *